(12) United States Patent
Shikama

(10) Patent No.: US 11,910,091 B2
(45) Date of Patent: Feb. 20, 2024

(54) CAMERA DEVICE AND PORTABLE ELECTRONIC DEVICE

(71) Applicant: Changzhou AAC Raytech Optronics Co., Ltd., Changzhou (CN)

(72) Inventor: Kazuo Shikama, Osaka (JP)

(73) Assignee: Changzhou AAC Raytech Optronics Co., Ltd., Changzhou (CN)

(*) Notice: Subject to any disclaimer, the term of this patent is extended or adjusted under 35 U.S.C. 154(b) by 0 days.

(21) Appl. No.: 17/739,204

(22) Filed: May 9, 2022

(65) Prior Publication Data

US 2023/0319410 A1  Oct. 5, 2023

(30) Foreign Application Priority Data

Mar. 31, 2022 (JP) ................................ 2022-059567

(51) Int. Cl.
| | |
|---|---|
| *H04N 23/68* | (2023.01) |
| *H04N 23/54* | (2023.01) |
| *G01D 5/20* | (2006.01) |
| *G03B 5/00* | (2021.01) |
| *G03B 13/36* | (2021.01) |

(52) U.S. Cl.
CPC .......... *H04N 23/687* (2023.01); *H04N 23/54* (2023.01); *H04N 23/6812* (2023.01); *G01D 5/20* (2013.01); *G03B 5/00* (2013.01); *G03B 13/36* (2013.01); *G03B 2205/0046* (2013.01)

(58) Field of Classification Search
CPC .. H04N 23/687; H04N 23/54; H04N 23/6812; H04N 23/55; H04N 23/68; H04N 23/685; H04N 23/50; G01D 5/20; G03B 5/00; G03B 13/36; G03B 2205/0046; G02B 27/646; G02B 7/04; G02B 27/64
See application file for complete search history.

(56) References Cited

U.S. PATENT DOCUMENTS

| | | | |
|---|---|---|---|
| 10,345,614 B2 * | 7/2019 | Ichihashi | ................ G02B 7/08 |
| 10,715,730 B1 * | 7/2020 | Xu | ......................... H04N 23/55 |
| 10,976,639 B2 * | 4/2021 | Tseng | ................ G03B 11/043 |
| 11,696,031 B1 * | 7/2023 | Shikama | ............... G03B 30/00 348/208.11 |

(Continued)

FOREIGN PATENT DOCUMENTS

WO  2015079773 A1  6/2015

*Primary Examiner* — Abdelaaziz Tissire
(74) *Attorney, Agent, or Firm* — W&G Law Group

(57) ABSTRACT

Provided is a camera device, including: a camera lens having an optical axis; a lens driving mechanism configured to drive the camera lens to move along the optical axis; an image stabilization mechanism including a movable frame, and an image sensor chip and a first flexible substrate arranged at the movable frame. The image stabilization mechanism is movable in a plane of the image sensor chip, and the first flexible substrate is made of liquid crystal polymer. The use of the LCP substrate for the first flexible substrate can greatly reduce elasticity of existing flexible substrates due to polyimide, so it has frequency characteristics similar to other rigid bodies and system resonance is not easily generated during movement of the image stabilization mechanism. Therefore, more precise servo control of the movable frame can achieved, thereby enabling camera device to have higher-quality hand-shake correction control and image stabilization control.

7 Claims, 9 Drawing Sheets

(56) References Cited

U.S. PATENT DOCUMENTS

| | | | | |
|---|---|---|---|---|
| 2013/0050515 A1* | 2/2013 | Wu | .......................... | G02B 7/08 |
| | | | | 359/557 |
| 2013/0142502 A1* | 6/2013 | Kang | ..................... | H04N 23/51 |
| | | | | 396/55 |
| 2013/0271930 A1* | 10/2013 | Haq | ........................ | H05K 3/00 |
| | | | | 156/247 |
| 2015/0055220 A1* | 2/2015 | Lim | ..................... | G02B 27/646 |
| | | | | 359/557 |
| 2016/0209621 A1* | 7/2016 | Park | ..................... | G02B 27/646 |
| 2019/0238753 A1* | 8/2019 | Urakami | ............. | H04N 23/6812 |
| 2020/0201139 A1* | 6/2020 | Naito | ................. | H04N 23/6812 |
| 2022/0066128 A1* | 3/2022 | Wade | .................. | G02B 27/646 |
| 2023/0077193 A1* | 3/2023 | Park | ....................... | H04N 23/57 |
| 2023/0185162 A1* | 6/2023 | Lee | .......................... | G03B 3/10 |
| | | | | 359/823 |
| 2023/0314832 A1* | 10/2023 | Shikama | ................ | G03B 13/36 |
| | | | | 359/554 |
| 2023/0317340 A1* | 10/2023 | Shikama | ................ | H04N 23/69 |
| | | | | 348/208.7 |

* cited by examiner

Section A-A

CAMERA DEVICE AND PORTABLE ELECTRONIC DEVICE

TECHNICAL FIELD

The present invention relates to the field of electronic technology, in particular to a camera device and a portable electronic device.

BACKGROUND

With the rapid development of photography technology, imaging devices including lens drives have been widely used in imaging equipment. The driving mechanism of a lens driving system applied to a common portable electronic device usually includes an autofocus mechanism that adjusts the focus in a direction of an optical axis and an image stabilization mechanism that drives the lens in a plane orthogonal to the optical axis.

The flexible substrates in the existing camera equipment mostly adopt polyimide (PI) as a base material. Since PI has high elasticity, the image stabilization mechanism is prone to system resonance during the movement process, thereby affecting the precision of the drive of the image stabilization mechanism, resulting a poor stabilization effect.

SUMMARY

The present invention aims to provide a camera device, which increases the driving accuracy of the image stabilization mechanism by reducing the elasticity of the first flexible substrate, thereby improving the stabilization effect.

An embodiment of the present invention provides a camera device, including: a camera lens having an optical axis; a lens driving mechanism configured to drive the camera lens to move along a direction of the optical axis; an image stabilization mechanism including a movable frame, and an image sensor chip and a first flexible substrate that are arranged at the movable frame. The image stabilization mechanism is movable in a plane of the image sensor chip, and the first flexible substrate is made of liquid crystal polymer.

In an improved embodiment, the image stabilization mechanism further includes: a first coil fixed to the movable frame, the first flexible substrate supplying power to the first coil; and a first magnet configured to drive the first coil to drive the movable frame to move in the plane of the image sensor chip.

In an improved embodiment, the movable frame includes a filter arranged at a front side of the image sensor chip.

In an improved embodiment, at least two first position detection components are carried on the first coil, and the at least two first position detection components are configured to cooperate with the first magnet to achieve position detection.

In an improved embodiment, wires connected to the first coil, the at least two first position detection components and the image sensor chip are arranged at an outer side of the image stabilization mechanism through the first flexible substrate.

In an improved embodiment, at an outside of the first coil and the first magnet, the first flexible substrate is bent at least twice along the direction of the optical axis.

In an improved embodiment, the lens driving mechanism includes: a holder, the camera lens being arranged at the holder; a second coil wound around the holder; a second flexible substrate configured to supply power to the second coil; and a second magnet configured to drive the second coil to drive the holder to move in the direction of the optical axis.

In an improved embodiment, the camera lens includes at least two lenses with a changeable spacing therebetween.

In an improved embodiment, the camera device further includes an optical path change component disposed on at least one of a front side or a rear side of the camera lens.

An embodiment of the present invention further provides a portable electronic device, including the camera device described above.

In the present invention, the use of the LCP substrate for the first flexible substrate can greatly reduce the elasticity of existing flexible substrates due to polyimide, so it has frequency characteristics similar to other rigid bodies and system resonance is not easily generated during movement of the image stabilization mechanism. In this way, more precise servo control of the movable frame can achieved, thereby enabling camera device to have higher-quality handshake correction control and image stabilization control. In addition, due to the reduced elasticity of the first flexible substrate, the first flexible substrate also has a function of maintaining the shape of the signal lines and power lines in the image stabilization mechanism, so that the signal lines and power lines will not move at will and interfere with the movement of the movable frame to affect the stabilization effect of the camera device.

REFERENCE NUMERALS

Figure 1:
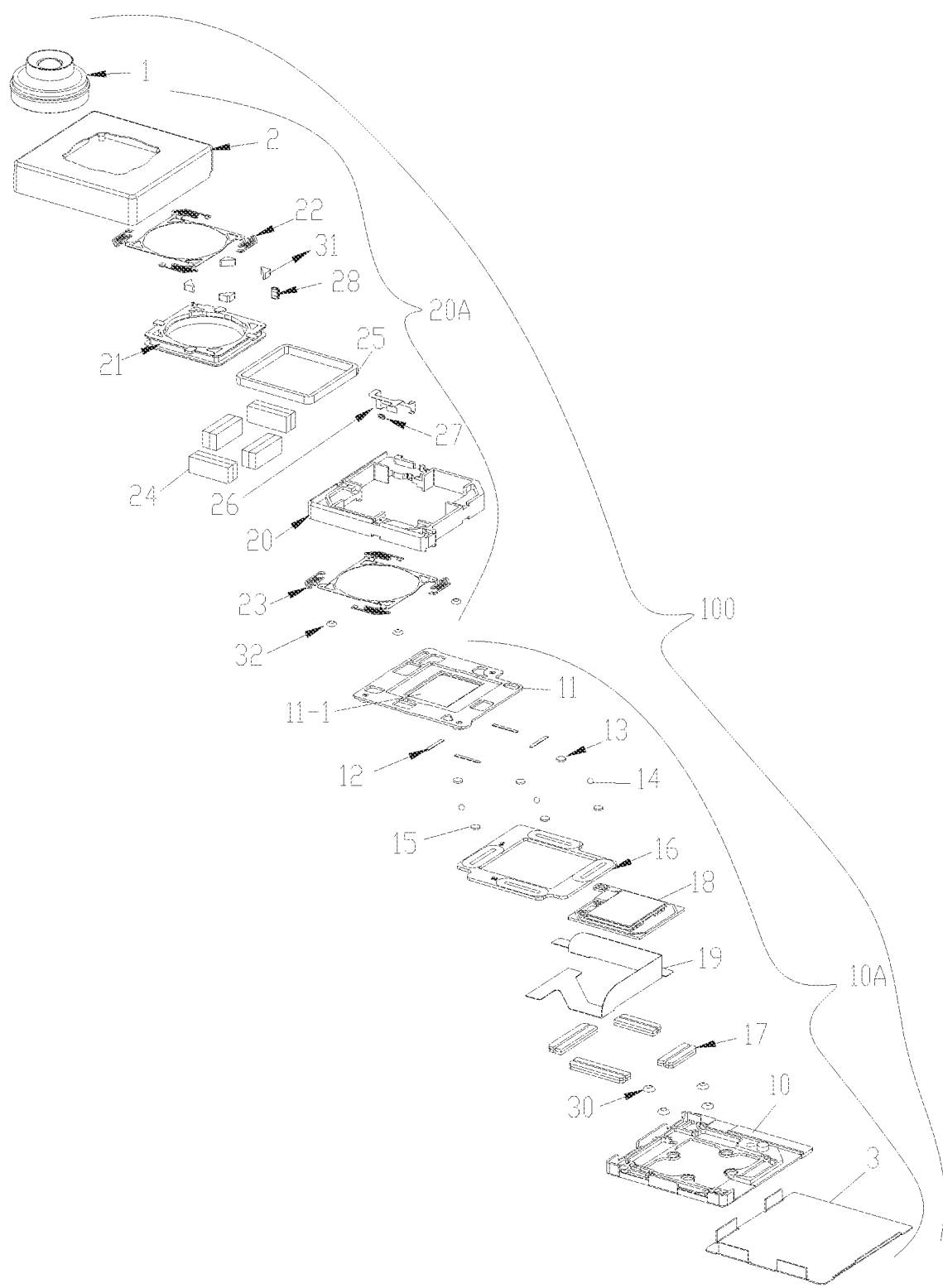
FIG. 1 is an exploded view of a camera device according to an embodiment of the present invention.
Figure 2:
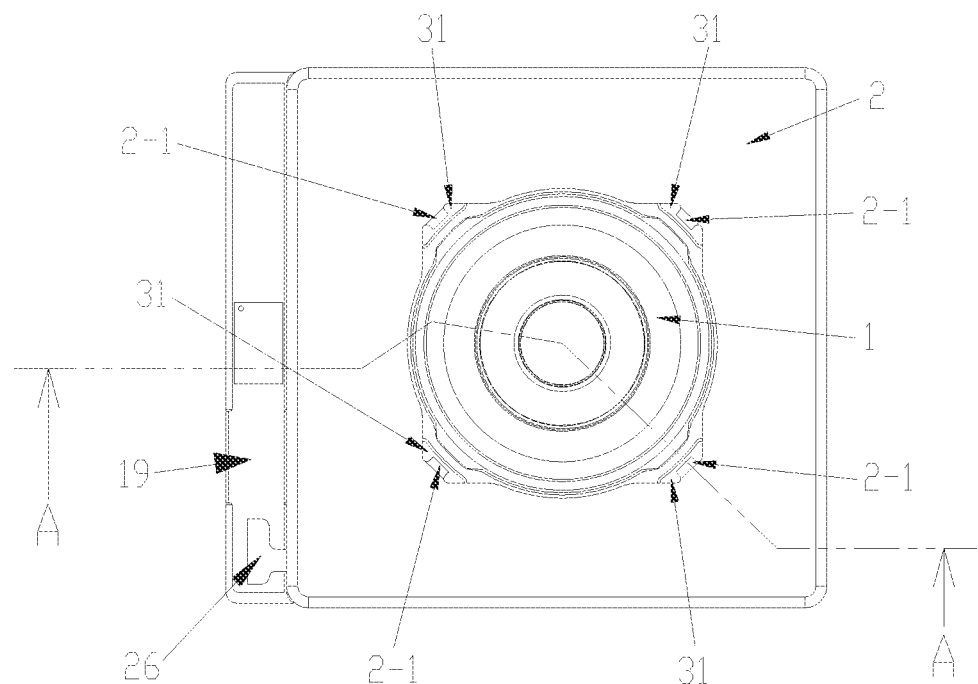
FIG. 2 is a top view of a camera device according to an embodiment of the present invention.
Figure 3:
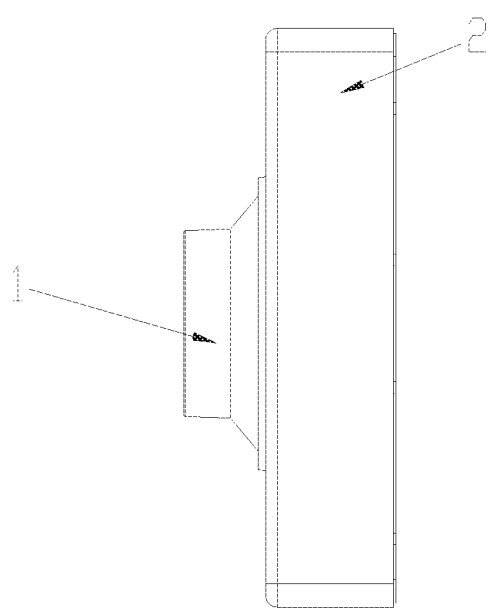
FIG. 3 is a side view of a camera device according to an embodiment of the present invention.
Figure 4:
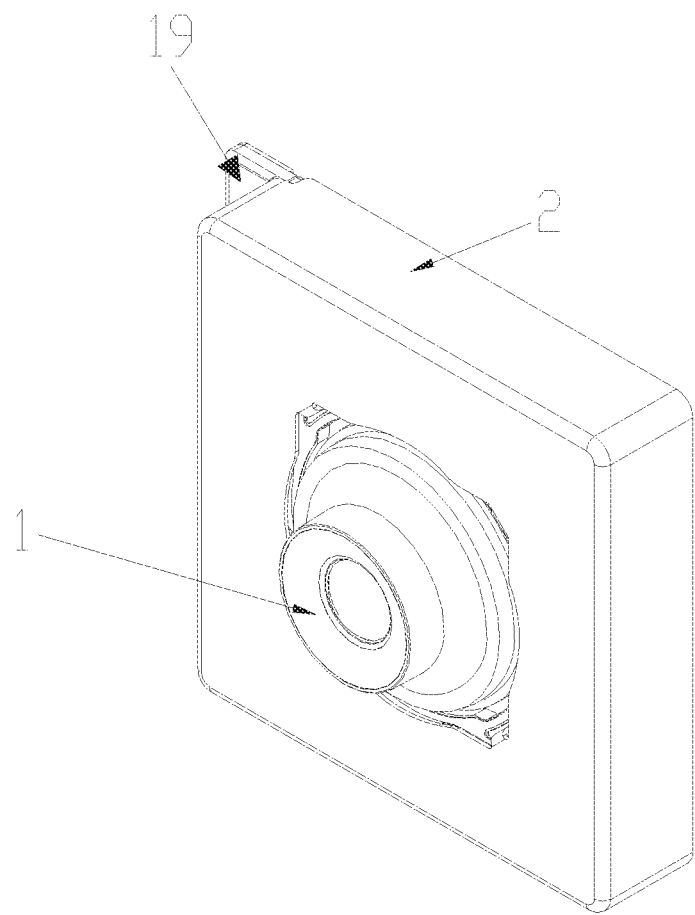
FIG. 4 is an axonometric view of a camera device according to an embodiment of the present invention.

1—camera lens;
2—second case;
21—claw member;
3—first case;
10A—image stabilization mechanism;
10—first base;
11—movable frame;
11-1—filter;
12—yoke;
13—first support plate;
14—support member;
15—second support plate;
16—first coil;
16-1—first position detection component 17—first magnet;
18—image sensor chip;
19—first flexible substrate;
19-1—curved surface A;
19-2—curved surface B;
20A—lens driving mechanism;
20—second base;
21—holder;
22—upper leaf spring;
23—lower leaf spring;
24—second magnet;
25—second coil;
26—second flexible substrate;
27—second position detection component;
28—position detection magnet;
30—first vibration damping gel;
31—third vibration damping gel;
32—second vibration damping gel;
40—optical axis;
50—retractable zoom mechanism;
60—focus or zoom mechanism;
70—optical path change component;
100—camera device;
200—portable electronic device.

The drawings herein are incorporated into and constitute a part of the present specification, illustrate embodiments of the present invention and explain principles of the present invention together with the specification.

DETAILED DESCRIPTION OF EMBODIMENTS

For better illustrating technical solutions of the present invention, embodiments of the present invention will be described in detail as follows with reference to the accompanying drawings.

It should be noted that, the described embodiments are merely exemplary embodiments of the present invention, which shall not be interpreted as providing limitations to the present invention. All other embodiments obtained by those skilled in the art without creative efforts according to the embodiments of the present invention are within the scope of the present invention.

The terms used in the embodiments of the present invention are merely for the purpose of describing particular embodiments but not intended to limit the present invention. Unless otherwise noted in the context, the singular form expressions "a", "an", "the" and "said" used in the embodiments and appended claims of the present invention are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present invention. In addition, when an element is described as being "on" or "under" another element in the context, it should be understood that the element can be directly or via an intermediate element located "on" or "under" another element.

An embodiment of the present invention provides a camera device. The present invention will be described in detail below with reference to the accompanying drawings.

As shown in FIG. 1 to FIG. 5, an optical system of the camera device 100 provided by an embodiment of the present invention includes a camera lens 1, a lens driving mechanism 20A configured to drive the camera lens 1, and an image stabilization mechanism 10A that are sequentially arranged from an object side. In addition, the camera device 100 further includes a first case 3 and a second case 2 that receive the optical system of the camera device 100.

Figure 5:
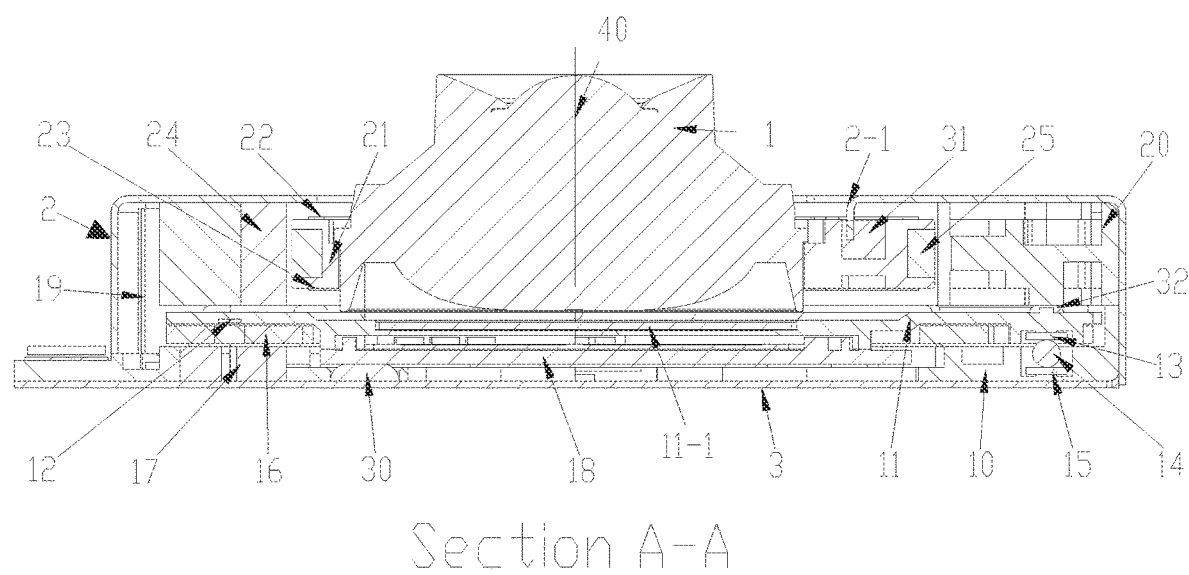
FIG. 5 is cross-sectional view along A-A shown in FIG. 2.
Figure 6:
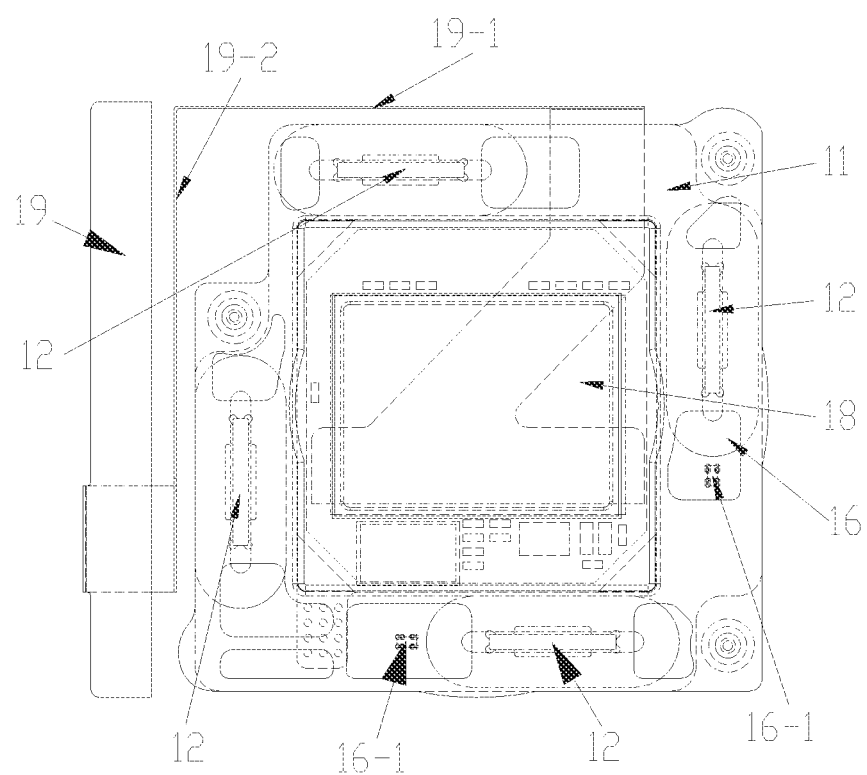
FIG. 6 is a top view of an image stabilization mechanism shown in FIG. 2.

In an embodiment, as shown in FIG. 1, FIG. 5 and FIG. 6, the image stabilization mechanism 10A includes a first base 10, a movable frame 11, a yoke 12, a first support plate 13, a support member 14, a second support plate 15, a first coil 16, a first magnet 17, an image sensor chip 18 and a flexible substrate 19.

The first base 10 is arranged on the first case 3. The first magnet 17 and the first support plate 15 are fixed to the first base 10. The image sensor chip 18, the first coil 16, the first support plate 13 and the yoke 12 are fixed to the movable frame 11. The movable frame 11 is supported by the support member 14 and can freely move on a plane perpendicular to the optical axis 40. A light beam from an object is incident to the camera lens 1 along the optical axis 40 and is imaged on an imaging surface of the image sensor chip 18.

In an embodiment, as shown in FIG. 5, the movable frame 11 includes a filter 11-1 disposed at a front side of the image sensor chip 18. The image sensor chip 18, the filter 11-1, and the movable frame 11 are integrally formed, thereby achieving decreasing of the number of the components, increasing of the perpendicularity of the image sensor chip 18 with respect to the optical axis 40, and decreasing of harmful tilt relative to the optical axis 40. In this way, it achieves decreasing of a plane mounting deviation of the image sensor chip 18, increasing of an overall rigidity of the image sensor chip 18, and increasing of protection against falling shock, and the like. Therefore, this structure not only contributes to miniaturization and low height of the camera device 100, but also enables the camera device 100 to have both great assembling performance and great overall performance of the image stabilization mechanism.

In an embodiment, as shown in FIG. 1 and FIG. 6, at least two first position detection components 16-1 are carried on the first coil 16. The first position detection component 16-1 can perform accurate position detection and stabilization control by detecting the magnetic flux of the first magnet 17.

In an embodiment, the first coil 16, the first position detection component 16-1, the signal lines and power lines of the image sensor chip 18 can be arranged at an outer side of the image stabilization mechanism through the first flexible substrate 19, so that the signal lines, power lines, etc. do not interfere with the movement of the image stabilization mechanism 10A.

In an embodiment, the first flexible substrate 19 is a flexible substrate using a liquid crystal polymer (Liquid Crystal Polymer, LCP) substrate, and a space for the movable frame 11 to move freely can be provided between the first case 3 and the second case 2. This space enables at least a curved surface A19-1 and a curved surface B19-2 of the first flexible substrate 19 to move on a plane without being hindered.

The use of the LCP substrate for the first flexible substrate 19 can greatly reduce the elasticity of existing flexible substrates due to polyimide (PI), so it has frequency characteristics similar to other rigid bodies and system resonance is not easily generated during movement of the image stabilization mechanism. In this way, more precise servo control of the movable frame 11 can achieved, thereby enabling camera device 100 to have higher-quality hand-shake correction control and image stabilization control.

In addition, due to the reduced elasticity of the first flexible substrate 19, the first flexible substrate 19 also has a function of maintaining the shape of the signal lines and power lines in the image stabilization mechanism, so that the signal lines and power lines will not move at will and interfere with the movement of the movable frame 11 to affect the stabilization effect of the camera device.

In an embodiment, the first coil 16 installed to the movable frame 11 is disposed opposite to the first magnet 17. The first coil 16 is located in a magnetic field generated by the first magnet 17. By energizing the first coil 16 to generate a high-efficiency electromagnetic force, the movable frame 11 can move freely in a plane perpendicular to the optical axis 40, thereby achieving stabilization.

In an embodiment, as shown in FIG. 1, FIG. 5 and FIG. 6, the yoke 12 is installed to the movable frame 11, and the yoke 12 pulls the magnetic field lines generated by the first magnet 17 to a center of the fixed first magnet 17. The yoke 12 and the first magnet 17 have a magnetic spring effect that can pull the center of the image sensor chip 18 toward the optical axis 40, so the camera device 100 has a looseness-eliminating effect and can reduce tilt of the image sensor chip 18 relative to the optical axis 40. In addition, this effect can be achieved by the magnetic attraction force between the yoke 12 and the first magnet 17, or by a spring or other component having a restoring characteristic.

In an embodiment, a surface of each of the first support plate 13 and the second support plate 15 that contacts the support member 14 has a certain surface precision, so that the support member 14 can rotate smoothly.

In an embodiment, the yoke 12 has a center maintaining function in a moving direction of the movable frame 11, and has a fall-off prevention function for the support member 14. Meanwhile, the yoke 12 also has a function of effectively and flexibly using the magnetic flux leaked from the first coil 16 to drive the movement of the movable frame 11, thereby allowing the camera device 100 to significantly reduce the used components.

In an embodiment, as shown in FIG. 5, an upper portion of the movable frame 11 is coated with a second vibration damping gel 32. For a sudden energization of the image stabilization mechanism 10A, the second vibration damping gel 32 can make the camera device 100 have a more accurate stabilization effect by producing a vibration damping effect that controls the pulsation action.

In an embodiment, as shown in FIG. 5, a first vibration damping gel 30 is applied between the first base 10 and the first case 3. For a sudden energization of the image stabilization mechanism, the first vibration damping gel 30 can also make the camera device 100 have a more accurate stabilization effect by producing a vibration damping effect that controls the pulsation action.

In an embodiment, the first coil 16 may have a plurality of single coil windings, or may be a conductive pattern formed on the first flexible substrate 19 based on a shape of the first coil 16.

In an embodiment, as shown in FIG. 1 and FIG. 5, the lens driving mechanism 20A is arranged at the image stabilization mechanism 10A, and the lens driving mechanism 20A includes a second base 20, a holder 21, an upper leaf spring 22, a lower leaf spring 23, a second magnet 24, a second coil 25, a second flexible substrate 26, a second position detection component 27 and a position detection magnet 28. The holder 21 has a space for receiving the camera lens 1. The second coil 25 is wound around the holder 21. The second magnet 24 is fixed to the second case 2. The second coil 25 is located in the magnetic field generated by the second magnet 24. By energizing the second coil 25 to generate a high-efficiency electromagnetic force, the camera lens 1 can freely move relative to the optical axis 40, thereby achieving focusing.

In an embodiment, as shown in FIG. 1 and FIG. 5, the upper leaf spring 22 and the lower leaf spring 23 are fixed to the holder 21. The upper leaf spring 22 and the lower leaf spring 23 can hold the camera lens 1 in a suspended state through their respective elasticity, without applying an electromagnetic force.

Furthermore, as shown in FIG. 1, the position detection magnet 28 is carried on the holder 21, and the second position detection component 27 is carried on the second flexible substrate 26. Similar to the image stabilization mechanism 10A, the second position detection component 27 can perform accurate position detection and focus control of the camera lens 1 by detecting the magnetic flux of the position detection magnet 28.

In an embodiment, the second flexible substrate 26 is arranged at an outer side of the lens driving mechanism 20A in order to be connected to the first flexible substrate 19. The second flexible substrate 26 and the first flexible substrate 19 may be integrated formed. When a control driving integrated circuit is carried on the first flexible substrate 19, the image stabilization mechanism 10A and the lens driving mechanism 20A can be energized, and servo control and the like can be performed according to a signal fed back by the second position detection component 27.

In an embodiment, as shown in FIG. 5, the holder 21 is coated with a third vibration damping gel 31. With such a structure, for a sudden energization of the lens driving mechanism 20A, the third vibration damping gel 31 and a claw member 2-1 protruding from the second case 2 produce a vibration damping effect that controls the pulsating action, so that the camera device 100 can have a more accurate auto-focusing performance.

Figure 7:
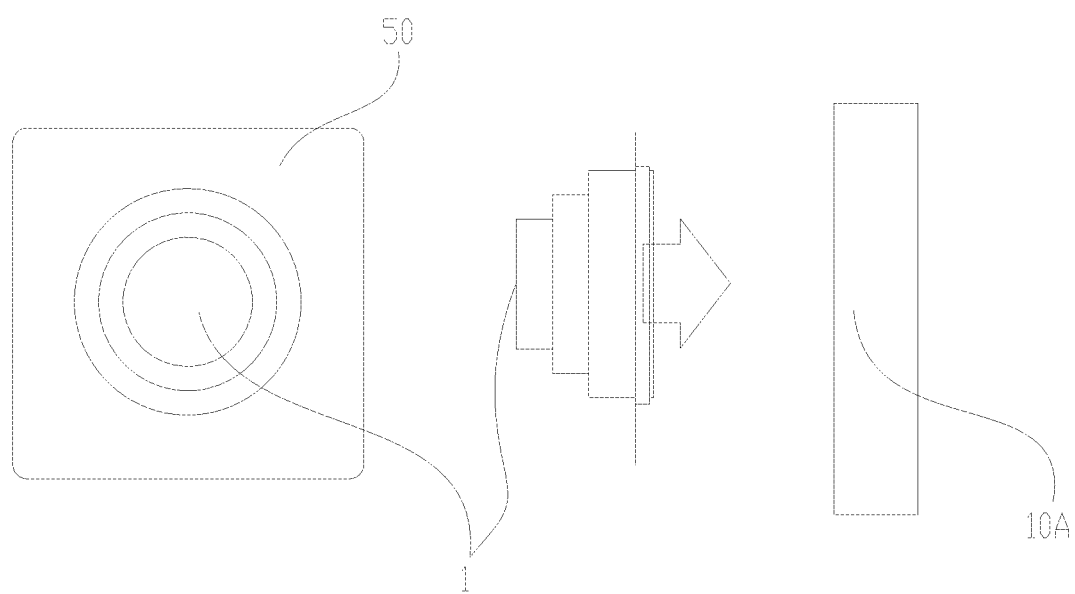
FIG. 7 is a schematic diagram of a structure of a retractable zoom mechanism according to an embodiment of the present invention.

In an embodiment, as shown in FIG. 7, the camera lens 1 includes at least two lenses with a changeable spacing therebetween. The zoom mechanism can change the spacing between the at least two lenses.

Figure 8:
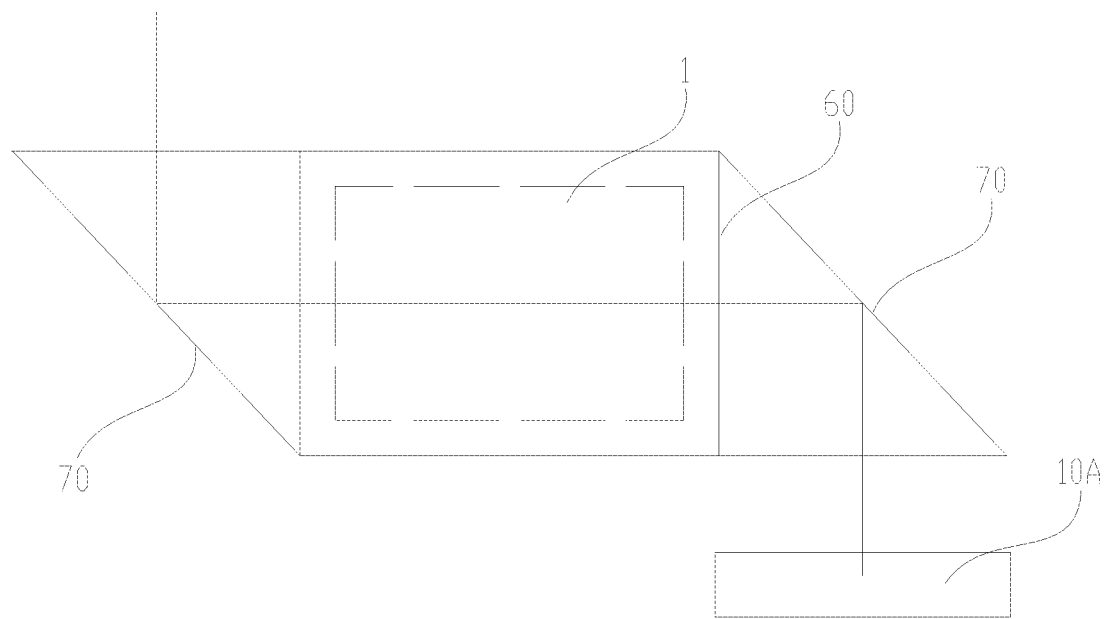
FIG. 8 is a schematic diagram of a focus or zoom mechanism according to an embodiment of the present invention.

In an embodiment, as shown in FIG. 8, the camera device further includes an optical path change component 70 disposed at a front side and/or a rear side of the lens 1, so the camera device can be used for a periscope. The optical path change component 70 may be a prism or the like. In this embodiment, the spacing between the lenses of the camera lens 1 can be constant or changeable, and the mechanism for driving the lens 1 can achieve focusing of the camera lens 1, or may be focus or zoom mechanism 60 that can achieve zooming and focusing of the camera lens 1 by changing the spacing between the lenses.

In some other embodiments, a hand-shake correction structure for preventing tilt of the optical axis due to hand-shake may be further provided.

Figure 9:
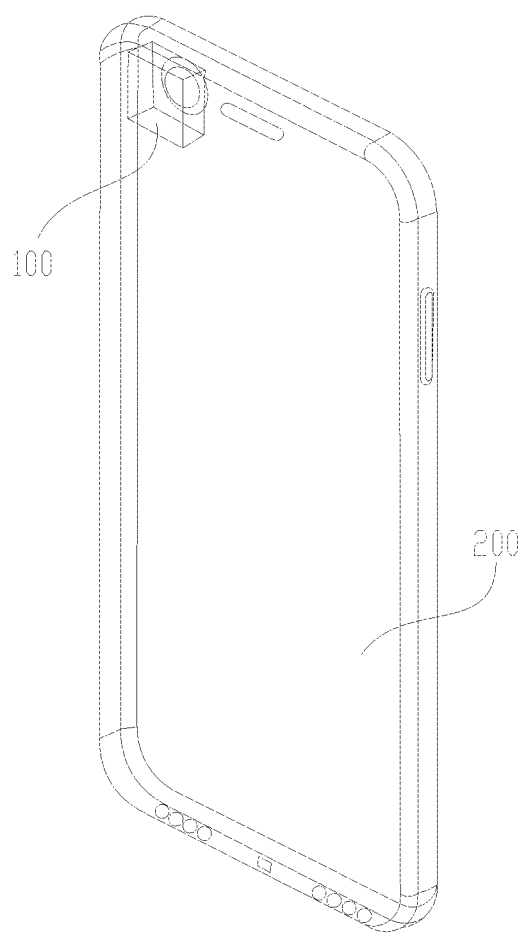
FIG. 9 is schematic diagram of a portable electronic device according to an embodiment of the present invention.

As shown in FIG. 9, the camera device 100 provided by the embodiments of the present invention can also be used for a portable electronic device 200 such as a smart phone, a feature phone, or a tablet device.

The above-described embodiments are merely preferred embodiments of the present invention and are not intended to limit the present invention. Various changes and modifications can be made to the present invention by those skilled in the art. Any modifications, equivalent substitutions and improvements made within the principle of the present invention shall fall into the protection scope of the present invention.

What is claimed is:

1. A camera device, comprising:
    a case;
    a camera lens received in the case, having an optical axis;
    a plurality of vibration damping gels received in the case;
    a lens driving mechanism received in the case, configured to drive the camera lens to move along a direction of the optical axis;
    an image stabilization mechanism received in the case, comprising a movable frame, a first base fixed to the case, and an image sensor chip and a first flexible substrate that are arranged at the movable frame, wherein the image stabilization mechanism is movable in a plane of the image sensor chip, and the first flexible substrate is made of liquid crystal polymer,
    the image stabilization mechanism further comprises a first coil fixed to the movable frame, and a first magnet fixed to the first base and configured to drive the first coil to drive the movable frame to move in the plane of the image sensor chip relative to the first base, the first flexible substrate supplies power to the first coil, the movable frame comprises a filter arranged at a front side of the image sensor chip, wherein the image sensor chip, the filter, and the movable frame are integrally formed, the lens driving mechanism comprises a second base fixed to the case, a holder holding the camera lens, a second coil wound around the holder, a second flexible substrate configured to supply power to the second coil, and a second magnet fixed to the second base and configured to drive the second coil to drive the holder to move in the direction of the optical axis relative to the second base, the plurality of vibration damping gels comprises a first vibration damping gel sandwiched between the movable frame and the second base, and a second vibration damping gel arranged at the holder, the case protrudes a claw member inserted into the second vibration damping gel.

2. The camera device as described in claim 1, wherein at least two first position detection components are carried on the first coil, and the at least two first position detection components are configured to cooperate with the first magnet to achieve position detection.

3. The camera device as described in claim 2, wherein wires connected to the first coil, the at least two first position detection components and the image sensor chip are arranged at an outer side of the image stabilization mechanism through the first flexible substrate.

4. The camera device as described in claim 1, wherein at an outside of the first coil and the first magnet, the first flexible substrate is bent at least twice along the direction of the optical axis.

5. The camera device as described in claim 1, wherein the camera lens comprises at least two lenses with a changeable spacing therebetween.

6. The camera device as described in claim 1, wherein the camera device further comprises an optical path change component disposed on at least one of a front side or a rear side of the camera lens.

7. A portable electronic device, comprising the camera device as described in claim 1.

* * * * *